United States Patent [19]

Uemoto et al.

[11] 4,292,235
[45] Sep. 29, 1981

[54] FIBER GLASS REINFORCED RESIN COMPOSITIONS

[75] Inventors: Yasuo Uemoto, Yokohama; Shigenori Togami, Kamakura, both of Japan; Tsumoru Takano, deceased, late of Kamakura, Japan, by Misayo Takano, legal representative; Ichiro Ono, Hatano; Takashi Kayama, Yokohama, both of Japan

[73] Assignee: Mitsui Toatsu Chemicals, Inc., Tokyo, Japan

[21] Appl. No.: 72,518

[22] Filed: Sep. 4, 1979
(Under 37 CFR 1.47)

[30] Foreign Application Priority Data

Sep. 4, 1978 [JP] Japan .................................. 53-107581

[51] Int. Cl.$^3$ ............................................... C08K 7/14
[52] U.S. Cl. ............................... 260/42.18; 260/42.52
[58] Field of Search ............. 260/42.18, 42.52, 30.6 R

[56] References Cited

U.S. PATENT DOCUMENTS 3,347,818 10/1967 Howe ................................. 260/42.18
3,419,519 12/1968 Abe et al. .......................... 260/42.18

*Primary Examiner*—Lewis T. Jacobs
*Attorney, Agent, or Firm*—Sughrue, Mion, Zinn, Macpeak and Seas

[57] ABSTRACT

There are provided fiber glass reinforced resin compositions comprising an acrylic copolymer consisting mainly of methyl methacrylate, fiber glass and an inorganic or organic compound containing pentavalent phosphorus atoms, whereby a deterioration phenomenon of whitening under the influence of water over a long period of time is remarkably improved.

4 Claims, No Drawings

FIBER GLASS REINFORCED RESIN COMPOSITIONS

BACKGROUND OF THE INVENTION

This invention relates to fiber glass reinforced resin compositions comprising an acrylic copolymer containing methyl methacrylate as the main component and improved in water resistance.

Fiber glass reinforced resin compositions concerning an acrylic copolymer containing methyl methacrylate as the main component have, hitherto, been known and put to practical use in the form of mainly, plate moldings for outdoor uses.

However, when such fiber reinforced resins are exposed out of doors over a long period of time, the interface between the resin and the fiber glass becomes white increasingly under the influence of water. A performance resisting to such a deterioration phenomenon is hereinafter referred to as water resistance.

This invention is directed to an improvement in water resistance of the fiber glass reinforced resins.

DESCRIPTION OF THE PRIOR ART

For preventing the whitening of fiber glass reinforced resins due to water there are, hitherto, provided various methods of increasing an adherence strength of the interface between the resin phase and the fiber glass, covering the surface of the resin with a film of good weatherability (e.g. a polyvinyl fluoride film) or coating with resins thereby preventing the interface from penetrating of water. As for increasing the adherence strength of the interface there are, in general, used methods of applying an organosilicon compound having high affinity to the resin (a silane coupling agent) onto the surface of the fiber glass or employing soft resins having high affinity to the resin as a binder or sizing agent of fiber glass.

However, taking into consideration a processability of fiber glass, a dispersion property of fiber glass upon molding of the fiber glass reinforced resin, an impregnating property of resin and costs, the silane coupling agent and the binder are naturally limited in the type and amount to be used. Accordingly, the fiber glass reinforced resins are not so improved in the water resistance that they are intolerable to outdoor uses over a long period of time.

Further, as for the methods of covering the resin surface with a film of good weatherability or coating with resins, the former has the disadvantage of the film being apt to peel off. In the latter a ultraviolet absorber is usually incorporated into the coating resin phase to impart a weatherability, but since the amount to be incorporated is limited in view of costs and coloring, the weatherability of the coating resin is insufficient. On the other hand, the coating with resins of good weatherability is expensive. In any event satisfactory results cannot be obtained with the conventional methods.

SUMMARY OF THE INVENTION

An object of this invention is to provide a fiber glass reinforced resin composition concerning an acrylic copolymer, improved in water resistance to such an extent that the whitening due to water does not substantially take place on the interface of fiber glass over a long period of time.

Another object of this invention is to improve a water resistance of fiber glass reinforced resin moldings without lowering a weatherability and light transmittance thereof.

The foregoing are, surprisingly, attained by adding a phosphorus compound of water absorbing property to a fiber glass reinforced resin containing an acrylic copolymer.

In accordance with this invention, there is provided a fiber glass reinforced resin composition comprising an acrylic copolymer containing methyl methacrylate (hereinafter referred to as MMA) as its main component, fiber glass for reinforcement and a phosphorus compound containing one or more pentavalent phosphorus atoms in its molecule.

DETAILED DESCRIPTION OF PREFERRED EMBODIMENTS

Acrylic copolymers containing MMA as the main component which may be used in this invention are copolymers of (A) MMA and (B) at least one of monomers copolymerizable with MMA. Preferred weight ratio of A/B may be within the range of 60–100/40–0.

Examples of the monomer copolymerizable with MMA include an aromatic hydrocarbon such as styrene, vinyl toluene and vinyl xylene, alkyl acrylate such as methyl acrylate, ethyl acrylate and butyl acrylate, methacrylic acid esters such as ethyl methacrylate, butyl methacrylate and hydroxyethyl methacrylate, polyfunctional monomers such as ethylene glycol diacrylate, ethylene glycol dimethacrylate, propylene glycol dimethacrylate, propylene glycol triacrylate, propylene glycol trimethacrylate, diethyleneglycol dimethacrylate and divinyl benzene, acrylic acid, methacrylic acid, acrylonitrile and the like.

Fiber glass for reinforcement which may be used in this invention may be commercially available "E" glass (electrical glass), "C" glass (chemical glass), "A" glass (alkali glass), "S" glass (special glass) and others and "C" glass is preferred.

Further, the fiber glass may be in the form of glass fiber roving, chopped strands, mats, fabric, knitted goods and others. An amount of the fiber glass is within the range of preferable, 15–60 parts by weight based on 100 parts of the acrylic copolymer.

Phosphorus compounds having one pentavalent phosphorus atom in a molecule which may be used in this invention are, for example, an inorganic phosphoric acid compound such as phosphoric acid; phosphoric acid esters of a chain, saturated monohydric alcohol such as isopropyl phosphate, di-isopropyl phosphate, butyl phosphate, dibutyl phosphate, tributyl phosphate, octyl phosphate, dioctyl phosphate and trioctyl phosphate and mixtures thereof; phosphoric acid esters of a chain, unsaturated monohydric alcohol such as allyl phosphate, diallyl phosphate, $\beta$-methacryloyloxyethyl phosphate, and di-$\beta$-methacryloyloxyethyl phosphate and mixtures thereof. Further, phosphorus compounds having two or more pentavalent phosphorus atoms in a molecule are, for example, an inorganic phosphoric acid compound such as pyrophosphoric acid and polyphosphoric acid, and esters thereof with a monohydric or polyhydric alcohol; phosphoric acid esters of an alicyclic polyhydric alcohol such as phytic acid and esters thereof with a monohydric or polyhydric alcohol; phosphoric acid esters of a chain, polyhydric alcohol such as ethylene glycol di-phosphoric acid ester.

As to the esters of the inorganic phosphoric acid compound (e.g. pyrophosphoric acid and polyphosphoric acid) with a monohydric or polyhydric alcohol, there are exemplified butyl pyrophosphate, dibutyl pyrophosphate, tributyl pyrophosphate, octyl pyrophosphate, dioctyl pyrophosphate, trioctyl pyrophosphate, $\beta$-methacryloyloxyethyl pyrophosphate, di-$\beta$-methacryloyloxyethyl pyrophosphate, butyl polyphosphate and mixtures thereof.

Further, as to the esters of the phosphoric acid ester of alicyclic polyhydric alcohol with a monohydric or polyhydric alcohol there are exemplified phosphoric acid (mixed) esters of phytic acid with butyl alcohol, phosphoric acid (mixed) esters of phytic acid with octyl alcohol and phosphoric acid (mixed) esters of phytic acid with hydroxyethyl methacrylate.

The phosphorus compound may be used within the range of 0.01–5 parts based on 100 parts by weight of the acrylic copolymer. With an amount of less than 0.01 parts by weight the effect on water resistance is insufficient, while with an amount of more than 5 parts by weight the nature of the phosphorus compound has undesirable influence on the quality of the fiber glass reinforced resin composition.

Next, the preparation process of the fiber glass reinforced resin composition will be explained. As to the acrylic copolymer according to this invention, a prepolymerization solution in which MMA and copolymerizable monomers have been copolymerized in part may be used (hereinafter referred to as syrup).

The prepolymerization may be effected by a bulk polymerization method with or without use of a catalyst for polymerization.

Also, in the prepolymerization the necessary additives and modifiers e.g. a molecular weight modifier and a promotor (an accelerator for decomposition of catalysts) may be added. In case of using polyfunctional monomers, they may be added at the beginning of prepolymerization or added divided during the prepolymerization or to the syrup after prepolymerization.

The prepolymerization may be carried out till the conversion to copolymers has reached 5–50% by weight based on the total amount of a monomer mixture which composes the acrylic copolymer. In this case the polymerization is discontinued usually, by cooling or by addition of a polymerization inhibitor.

The phosphorus compounds according to this invention may be added to the monomer mixture prior to the prepolymerization or added during the prepolymerization or to the syrup after prepolymerization.

Next, the thus obtained mixture of the acrylic copolymer with the phosphorus compound is impregnated to the fiber glass for reinforcement and cured.

Though the curing is, in general, carried out with use of an initiator for polymerization such as azo compounds or peroxides, it may be conducted by a process other than the polymerization with heat only, e.g. using a photosensitizer such as benzoinethyl ether and ultraviolet ray or using radiation.

The cure reaction temperature is usually comprised between normal temperature and about 120° C. The curing may be carried out in a mould imparting desired shapes e.g. flat panels, corrugated panels and towers and tanks.

Further, a mixture solution may be used for curing, which has been prepared by adding to the syrup at least one of monomers for the acrylic copolymer, a polymeric ultraviolet absorber such as MMA-styrene copolymer, an antioxidant, a coloring agent and a filler.

In this way, the fiber glass reinforced resins obtained are improved in weatherability and accordingly, are suitable for materials in outdoor uses, e.g. a lighting panel, a screening panel, a greenhouse covering material and others.

This invention will be illustrated by the following non-limitative examples. For comparison reference examples are also set forth.

Rating of the water resistance is effected as follows: A test sample is dipped in a water tank maintained at 75° C. for 6 hours and then dried at 20° C. in a desiccator containing a dehydrating agent (e.g. silica gel) for 16 hours. After drying a total light transmittance (Tt %) and a diffused light transmittance (Td %) are measured by means of Hazeometer-HGM-1 (manufactured by Suga Shikenki Corp., Japan) and the water resistance is rated by changes in transmittance before and after the test and changes in appearance of the sample. Usually, as the whitening advances, a Tt % decreases and a Td % increases.

EXAMPLE 1

To a 100 ml eggplant type flask are charged 50 gr of a syrup (solid content, 30% by weight) having the composition of MMA/styrene/trimethylolpropane trimethacrylate=75/25/3 (weight ratio), 0.05 gr (0.1 part by weight) of Isopropyl Acid Phosphate (trade name by Daihachi Kagaku K.K., isopropyl phosphate/di-isopropyl phosphate=1 mol/1 mol) and 0.5 gr of tert.-butyl perpivalate. After mixing well the mixture is subject to degasification under reduced pressure of 100 mm Hg for five minutes.

Next, the mixture solution is poured onto a cellophane film of 30×30 cm² set with gaskets and then 12.5 gr of "C" glass fiber (chopped strands of 2" in length) are uniformly applied thereon.

Successively, the upper surface of the square frame is covered with a cellophane film while expelling air involved during the operation and the four corners are sealed with a tape.

Thereafter, the above mixture solution is placed in a hot-air thermostat maintained at 65° C. and then, is heated for 30 minutes and cured. After further 30 minutes, the hot-air temperature is elevated to 110° C., at temperature of which curing is further continued for ten minutes. After cooling a test sample obtained is used for the evaluation of water resistance as mentioned above.

EXAMPLE 2

The procedure of Example 1 is repeated except using 1.0 gr (2.0 parts by weight) of Isopropyl Acid Phosphate.

The test results of Examples 1 and 2 are set forth in Table 1.

REFERENCE EXAMPLES 1–3

As set forth in Table 1, Reference Example 1 is related to the case of using no additive, Reference Example 2 to the case of adding 0.0025 gr (0.005 parts by weight) of Isopropyl Acid Phosphate and Reference Example 3 to the case of using 3 gr (6 parts by weight) of Isopropyl Acid Phosphate.

Table 1 shows that the fiber glass reinforced resins of this invention (Examples 1 and 2) are superior in water resistance to those of Reference Examples 1–3.

TABLE 1

| Run No. | Resin Composition | Additives | Before test on water resistance Tt, %[2] | Before test on water resistance Td, %[3] | After test on water resistance Tt, % | After test on water resistance Td, % | Change Ratio[4] Tt | Change Ratio[4] Td | Appearance after test[5] |
|---|---|---|---|---|---|---|---|---|---|
| Ex. 1 | MMA/ST/TMPT[1] = 75/25/3 | Isopropyl Acid Phosphate, 0.1 part | 89.5 | 24.0 | 87.4 | 30.5 | 2.35 | 27.1 | A |
| Ex. 2 | MMA/ST/TMPT[1] = 75/25/3 | Isopropyl Acid Phosphate, 2 parts | 89.2 | 24.1 | 86.9 | 33.4 | 2.58 | 38.6 | A |
| Ref. Ex. 1 | MMA/ST/TMPT[1] = 75/25/3 | — | 89.0 | 23.5 | 85.0 | 40.5 | 4.49 | 72.3 | B |
| Ref. Ex. 2 | MMA/ST/TMPT[1] = 75/25/3 | Isopropyl Acid Phosphate, 0.005 parts | 89.7 | 23.3 | 85.2 | 41.1 | 5.02 | 72.7 | B |
| Ref. Ex. 3 | MMA/ST/TMPT[1] = 75/25/3 | Isopropyl Acid Phosphate, 6 parts | 89.2 | 24.2 | 83.0 | 44.2 | 6.95 | 82.6 | C |

Notes:
[1]MMA = Methyl methacrylate
ST = Styrene
TMPT = Trimethylolpropane trimethacrylate
[2]Total light transmittance
[3]Diffused light transmittance
[4]Change Ratio = Change amount in light transmittance before and after test/Light transmittance before test × 100%
[5]A = Little whitening
B = Considerable whitening
C = Very remarkable whitening

EXAMPLE 3

The procedure of Example 1 is repeated except using 0.05 parts of orthophosphoric acid instead of 0.1 part of Isopropyl Acid Phosphate.

EXAMPLE 4

The procedure of Example 1 is repeated except using 0.15 parts of dioctyl phosphate (manufactured by Daihachi Kagaku K.K.) as the phosphorus compound.

EXAMPLE 5

The procedure of Example 1 is repeated except using 0.1 part of Octyl Acid Phosphate (trade name by Daihachi Kagaku K.K., monooctyl phosphate/dioctyl phosphate=1 mol/1 mol) as the phosphorus compound.

EXAMPLE 6

The procedure of Example 1 is repeated except using 0.1 part of mono-iso-decyl phosphate (manufactured by Daihachi Kagaku K.K.) as the phosphorus compound.

EXAMPLE 7

The procedure of Example 1 is repeated except using as the phosphorus compound 0.5 parts of β-methacryloyloxyethyl phosphate,

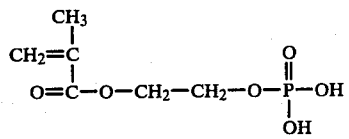

EXAMPLE 8

The procedure of Example 1 is repeated except using 0.1 part of β-Methacryloyloxyethyl Acid Phosphate (Kayama-PM-2, trade name by Kayaku Noury Corp, β-methacryloyloxyethyl phosphate/di-β-methacryloyloxyethyl phosphate=1 mol/1 mol) as the phosphorus compound.

EXAMPLE 9

The procedure of Example 1 is repeated except using 0.1 part of tributyl phosphate (manufactured by Daihachi Kagaku K.K.) as the phosphorus compound.

EXAMPLE 10

The procedure of Example 1 is repeated except using 0.2 parts of trioctyl phosphate (manufactured by Daihachi Kagaku K.K.) as the phosphorus compound.

The results of Examples 3–10 are set forth in Table 2.

TABLE 2

| Run No. Ex. | Copolymer Composition | Additives, parts by weight | Before test on water resistance Tt, % | Before test on water resistance Td, % | After test on water resistance Tt, % | After test on water resistance Td, % | Change Ratio Tt | Change Ratio Td | Appearance after test |
|---|---|---|---|---|---|---|---|---|---|
| 3 | MMA/ST/TMPT = 75/25/3 | Orthophosphoric acid, 0.05 parts | 89.5 | 24.7 | 87.7 | 31.2 | 2.01 | 26.2 | A |
| 4 | MMA/ST/TMPT = 75/25/3 | Dioctyl phosphate, 0.15 parts | 89.0 | 25.7 | 87.0 | 35.0 | 2.25 | 36.2 | A |
| 5 | MMA/ST/TMPT = 75/25/3 | Octyl Acid Phosphate, 0.1 part | 89.3 | 24.5 | 88.0 | 33.7 | 1.46 | 37.6 | A |
| 6 | MMA/ST/TMPT = 75/25/3 | Iso-Decyl Phosphate, 0.1 part | 89.0 | 25.7 | 86.3 | 32.7 | 3.03 | 27.2 | A |
| 7 | MMA/ST/TMPT = 75/25/3 | β-Methacryloyloxyethyl phosphate, 0.5 parts | 90.7 | 24.0 | 88.0 | 33.4 | 2.98 | 39.2 | A |
| 8 | MMA/ST/TMPT = 75/25/3 | β-Methacryloyloxyethyl Acid Phosphate, 0.1 part | 89.5 | 23.3 | 87.7 | 33.0 | 2.23 | 41.6 | A |

TABLE 2-continued

| Run No. Ex. | Copolymer Composition | Additives, parts by weight | Before test on water resistance Tt, % | Td, % | After test on water resistance Tt, % | Td, % | Change Ratio Tt | Td | Appearance after test |
|---|---|---|---|---|---|---|---|---|---|
| 9 | MMA/ST/TMPT = 75/25/3 | Tributyl phosphate, 0.1 part | 89.6 | 24.0 | 87.3 | 34.5 | 2.57 | 43.8 | A |
| 10 | MMA/ST/TMPT = 75/25/3 | Trioctyl phosphate, 0.2 parts | 89.6 | 24.7 | 88.0 | 31.8 | 1.79 | 28.7 | A |

EXAMPLE 11

The procedure of Example 1 is repeated except using 50 gr of a syrup (solid content, 35%) having a composition of MMA/styrene/ethylene glycol diacrylate=65/35/4 (weight ratio) and 0.2 gr (0.4 parts by weight) of Octyl Acid Phosphate as the phosphorus compound.

EXAMPLE 12

The procedure of Example 11 is repeated except using 1 gr (2.0 parts by weight) of Octyl Acid Phosphate as the phosphorus compound.

REFERENCE EXAMPLE 4

The procedure of Example 11 is conducted using no additive.

The results of Examples 11 and 12 and Reference Example 4 are set forth in Table 3 which proves the Examples of this invention are superior in water resistance.

weight) of $\beta$-methacryloyloxyethyl phosphate as the phosphorus compound.

EXAMPLE 14

The procedure of Example 13 is repeated except using "E" glass fiber instead of "C" glass fiber as the glass fiber.

REFERENCE EXAMPLE 5

The procedure of Example 13 is conducted except using no additive.

REFERENCE EXAMPLE 6

The procedure of Example 14 is conducted except using no additive.

The results of Examples 13 and 14 and Reference Examples 5 and 6 are set forth in Table 4. Examples 13 and 14 according to this invention are superior in water resistance to those of Reference Examples.

TABLE 4

| Run No. | Copolymer Composition | Additives | Glass Fiber | Before test on water resistance Tt, % | Td, % | After test on water resistance Tt, % | Td, % | Change Ratio Tt | Td | Appearance after test |
|---|---|---|---|---|---|---|---|---|---|---|
| Ex. 13 | MMA/EA/EGDA* = 95/5/3 | $\beta$-Methacryloyloxyethyl Phosphate, 0.1 part | "C" glass fiber | 88.5 | 30.4 | 86.3 | 37.6 | 2.49 | 23.7 | A |
| Ref. Ex. 5 | MMA/EA/EGDA* = 95/5/3 | — | "C" glass | 88.4 | 31.5 | 84.2 | 49.2 | 4.75 | 56.2 | B |
| Ex. 14 | MMA/EA/EGDA* = 95/5/3 | $\beta$-Methacryloyloxyethyl Phosphate, 0.1 part | "E" glass fiber | 87.2 | 66.0 | 85.9 | 69.2 | 1.49 | 4.85 | A |
| Ref. Ex. 6 | MMA/EA/EGDA* = 95/5/3 | — | "E" glass Fiber | 87.0 | 65.9 | 84.0 | 72.3 | 3.45 | 9.71 | B |

*EA = Ethyl acrylate
EGDA = Ethylene glycol diacrylate

TABLE 3

| Run No. | Copolymer Composition | Additives | Before test on water resistance Tt, % | Td, % | After test on water resistance Tt, % | Td, % | Change Ratio Tt | Td | Appearance after test |
|---|---|---|---|---|---|---|---|---|---|
| Ex. 11 | MMA/ST/EGDA* = 65/35/4 | Octyl Acid Phosphate, 0.4 parts | 90.5 | 24.5 | 88.4 | 30.5 | 2.32 | 24.5 | A |
| Ex. 12 | MMA/ST/EGDA* = 65/35/4 | Octyl Acid Phosphate, 2 parts | 89.8 | 24.8 | 88.0 | 31.6 | 2.00 | 27.4 | A |
| Ref. Ex. 4 | MMA/ST/EGDA* 65/35/4 | — | 89.7 | 25.0 | 85.1 | 42.3 | 5.13 | 69.2 | B |

*EGDA = Ethylene glycol diacrylate

EXAMPLE 13

The procedure of Example 1 is repeated except using 50 gr of a syrup (solid content, 30%) having a composition of MMA/ethyl acrylate/ethylene glycol diacrylate=95/5/3 (weight ratio) and 0.05 gr (0.1 part by

EXAMPLE 15

The procedure of Example 8 is repeated except using a syrup (solid content, 30 weight %) having a copolymer composition of MMA/styrene/methacrylic acid/trimethylolpropane trimethacrylate=75/25/5/3 (weight ratio).

EXAMPLE 16

The procedure of Example 8 is repeated except using a syrup (solid content, 30 weight %) having a copolymer composition of MMA/styrene/hydroxyethyl methacrylate/trimethylolpropane trimethacrylate=75/25/5/3 (weight ratio).

The results of Examples 15 and 16 are set forth in Table 5, from which it is apparent that the Examples of this invention have good water resistance.

TABLE 5

| Run No. | Copolymer Composition | Additives | Before test on water resistance Tt, % | Before test on water resistance Td, % | After test on water resistance Tt % | After test on water resistance Td, % | Change Ratui Tt | Change Ratui Td | Appearance after test |
|---|---|---|---|---|---|---|---|---|---|
| Ex. 15 | MMA/ST/MAA/TMPT*1 = 75/25/5/3 | β-Methacryloyloxy ethyl Acid Phosphate, 0.1 part | 89.6 | 23.1 | 87.5 | 32.1 | 2.34 | 39.0 | A |
| Ex. 16 | MMA/ST/HEMA/TMPT*2 = 75/25/5/3 | — | 89.9 | 23.3 | 87.2 | 32.5 | 3.00 | 39.5 | A |

*1 MMA = Methacrylic acid
*2 HEMA = Hydroxyethyl methacrylate

What we claim is:

1. Fiber glass reinforced resin compositions having improved water resistance which comprise an acrylic copolymer containing methyl methacrylate as the main component, fiber glass for reinforcement and a phosphorus compound having one or more pentavalent phosphorus atoms in its molecule, said phosphorus compound being present in an amount of 0.01 to 5 parts by weight based on 100 parts by weight of the acrylic copolymer.

2. The fiber glass reinforced resin compositions of claim 1 wherein said phosphorus compound is at least one member selected from the group consisting of (i) an inorganic phosphoric acid compound, (ii) phosphoric acid esters of a chain, saturated monohydric alcohol and mixtures thereof, (iii) phosphoric acid esters of a chain, unsaturated monohydric alcohol and mixtures thereof, (iv) phosphoric acid esters of a chain polyhydric alcohol, and (v) phosphoric acid esters of an alicyclic polyhydric alcohol.

3. The fiber glass reinforced resin compositions of claim 1, wherein said acrylic copolymer is selected from the group consisting of copolymers of methyl methacrylate and at least one monomer selected from the group consisting of monomers copolymerizable with methyl methacrylate.

4. The fiber glass reinforced resin compositions of claim 1 wherein said acrylic copolymer is a prepolymerization solution in which methyl methacrylate and at least one other copolymerizable monomer have been copolymerized in part.

* * * * *